US011507975B2

(12) United States Patent
Gong et al.

(10) Patent No.: US 11,507,975 B2
(45) Date of Patent: Nov. 22, 2022

(54) INFORMATION PROCESSING METHOD AND APPARATUS

(71) Applicant: Tencent Technology (Shenzhen) Company Limited, Shenzhen (CN)

(72) Inventors: Bing Gong, Shenzhen (CN); Min Luo, Shenzhen (CN); Jianchen Zhu, Shenzhen (CN); Li Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 476 days.

(21) Appl. No.: 15/976,542

(22) Filed: May 10, 2018

(65) Prior Publication Data

US 2018/0260848 A1  Sep. 13, 2018

Related U.S. Application Data

(63) Continuation of application No. PCT/CN2017/075073, filed on Feb. 27, 2017.

(30) Foreign Application Priority Data

Mar. 2, 2016  (CN) .......................... 201610119095.8

(51) Int. Cl.
*G06Q 30/02* (2012.01)
*G06F 16/248* (2019.01)
(Continued)

(52) U.S. Cl.
CPC ....... *G06Q 30/0256* (2013.01); *G06F 16/248* (2019.01); *G06F 16/24578* (2019.01);
(Continued)

(58) Field of Classification Search
CPC ...................... G06Q 30/0277; G06Q 30/0256
See application file for complete search history.

(56) References Cited

U.S. PATENT DOCUMENTS 7,831,610 B2 * 11/2010 Takata ................ G06F 16/3322
707/767
8,117,197 B1 * 2/2012 Cramer .............. G06Q 30/0256
707/731
(Continued)

FOREIGN PATENT DOCUMENTS

CN  101241512 A  8/2008
CN  101984423 A  3/2011
(Continued)

OTHER PUBLICATIONS

Liu, et al. 2002. Personalized web search by mapping user queries to categories. In Proceedings of the eleventh international conference on Information and knowledge management (CIKM '02). Association for Computing Machinery, New York, NY, USA, 558-565. https://doi.org/10.1145/584792.584884 (Year: 2002).*
(Continued)

*Primary Examiner* — Abhishek Vyas
*Assistant Examiner* — Monica A Mandel
(74) *Attorney, Agent, or Firm* — Arentfox Schiff LLP

(57) ABSTRACT

A method of generating content information that matches at least one stored keyword is described. At least one keyword associated with content information is stored. At least one previously searched keyword in a search record is matched with the at least one stored keyword associated with the content information. First-category mapping data is generated based on a first mapping between the matched at least one stored keyword and the at least one previously searched keyword. Second-category mapping data is generated based on the content information and the at least one stored keyword. A received target keyword is determined to be included in the first-category mapping data. In response to the received target keyword, which is included in the first-category mapping data, circuitry of a terminal searches for the content information associated with the target keyword
(Continued)

in the second-category mapping data and displays the content information.

15 Claims, 7 Drawing Sheets

(51) Int. Cl.
  *G06F 16/28*      (2019.01)
  *G06F 16/9535*     (2019.01)
  *G06F 16/2457*     (2019.01)
  *G06F 16/954*      (2019.01)
  *G06F 16/9536*     (2019.01)

(52) U.S. Cl.
  CPC .......... *G06F 16/285* (2019.01); *G06F 16/954* (2019.01); *G06F 16/9535* (2019.01); *G06F 16/9536* (2019.01); *G06Q 30/0277* (2013.01)

(56) References Cited

U.S. PATENT DOCUMENTS

| | | | | |
|---|---|---|---|---|
| 8,380,563 | B2* | 2/2013 | Datar | G06Q 30/02 705/40 |
| 9,202,241 | B2 | 12/2015 | Gross | |
| 2007/0143176 | A1* | 6/2007 | Nong | G06Q 30/02 705/14.71 |
| 2008/0010024 | A1 | 1/2008 | Diamond | |
| 2008/0010270 | A1 | 1/2008 | Gross | |
| 2008/0021878 | A1* | 1/2008 | Jeong | G06Q 30/02 |
| 2009/0006207 | A1* | 1/2009 | Datar | G06Q 30/0256 705/14.54 |
| 2011/0047028 | A1* | 2/2011 | Kim | G06Q 30/0256 705/14.52 |
| 2011/0208708 | A1* | 8/2011 | Liu | G06F 16/3322 707/723 |
| 2013/0275269 | A1* | 10/2013 | Chen | G06Q 30/0639 705/26.62 |
| 2014/0195348 | A1 | 7/2014 | Sun | |
| 2015/0379571 | A1 | 12/2015 | Grbovic et al. | |
| 2016/0170982 | A1* | 6/2016 | Djuric | G06F 16/3347 707/740 |
| 2017/0242875 | A1* | 8/2017 | Jiang | G06F 16/248 |

FOREIGN PATENT DOCUMENTS

| | | |
|---|---|---|
| CN | 102360358 A | 2/2012 |
| CN | 103136257 A | 6/2013 |
| CN | 103514191 A | 1/2014 |
| CN | 103744856 A | 4/2014 |
| CN | 103914492 A | 7/2014 |
| CN | 105808685 A | 7/2016 |

OTHER PUBLICATIONS

International Search Report dated Jun. 1, 2017, for PCT/CN2017/075073, 6 pgs. English translation provided.
European Search Report and Written Opinion Issued in Application EP17759206 dated Jul. 24, 2019, (10 pages).
Chinese Office Action Issued in Application CN201610119095.8 dated Apr. 26, 2020, (13 pages).
European Office Action Issued in EP17759206.0-1213 dated Mar. 9, 2021, (9 pages).

* cited by examiner

INFORMATION PROCESSING METHOD AND APPARATUS

RELATED APPLICATION

This application is a continuation of International Application No. PCT/CN2017/075073, filed on Feb. 27, 2017, which claims priority to Chinese Patent Application No. 201610119095.8, filed on Mar. 2, 2016. The entire disclosures of the prior applications are hereby incorporated by reference in their entirety.

FIELD OF THE TECHNOLOGY

The present disclosure relates to the field of computer technologies.

BACKGROUND OF THE DISCLOSURE

An advertisement promotion service of a related search engine is usually charged based on a bidding rank mechanism. An advertisement promoter first needs to purchase a plurality of binding keywords. When a user of the search engine enters a retrieval entry in the search engine for searching, if the entered retrieval entry is the same as a binding keyword of an advertisement promoter, advertisements matching the binding keyword are found, the found advertisements matching the binding keyword are sorted according to payments of advertisement promoters, and the sorted advertisements are presented to the user, to implement promotion.

However, it is found through research that a method for searching for promotion information by comparing a retrieval entry and a binding keyword of promotion information in the related technology at least has the following problem: Because in the bidding rank mechanism, an advertisement promoter needs to pay for multiple binding keywords set for an advertisement of the promoter, the advertisement promoter usually can set only a small quantity of binding keywords to match a retrieval entry of a user of a search engine. However, for a manner of making a comparison to determine whether a retrieval entry includes a keyword in the related technology, it is difficult for the keywords set by the advertisement promoter to be hit. For example, a binding keyword cannot be hit when the user of the search engine uses a synonym of the binding keyword as the retrieval entry, leading to a low recall rate of the method for searching for promotion information in the related technology.

SUMMARY

In view of this, to resolve a technical problem in the related technology that a recall rate of content information (e.g., promotion information) is low in a method for searching for corresponding content information merely by performing matching between a stored keyword and an entered retrieval entry, an information processing method is provided.

In one embodiment of the present disclosure, there is provided the information processing method. At least one keyword associated with content information is stored and at least one previously searched keyword in a search record is matched with the at least one stored keyword associated with the content information. First-category mapping data is generated based on a first mapping between the matched at least one stored keyword and the at least one previously searched keyword. Second-category mapping data is generated based on the content information and the at least one stored keyword. A received target keyword is determined to be included in the first-category mapping data. In response to the received target keyword, which is included in the first-category mapping data, the content information is searched by circuitry of an information processing apparatus for in the second-category mapping data and the content information is displayed.

In an embodiment, the at least one previously searched keyword is traversed in the search record. The at least one stored keyword and the at least one previously searched keyword are searched in a third-party search engine. A similarity is calculated, by using a document vector model, between a search result corresponding to the at least one stored keyword and a search result corresponding to the at least one previously searched keyword. When the similarity is greater than a threshold, the at least one previously searched keyword is determined to match the at least one stored keyword.

In an embodiment, the at least one previously searched keyword is traversed in the search record. A text similarity is calculated between the at least one stored keyword and the at least one previously searched keyword. When the similarity is greater than a threshold, the at least one previously searched keyword is determined to match the at least one stored keyword.

In an embodiment, the at least one stored keyword is grouped into a group based on at least one corresponding meaning of the at least one stored keyword. The at least one stored keyword includes a plurality of stored keywords. The first-category mapping data is traversed to obtain the at least one stored keyword and the matched at least one previously searched keyword. A second mapping is established between the matched at least one previously searched keyword and one of the plurality of stored keywords in the group. The mapped at least one previously searched keyword and the one of the plurality of stored keywords are included in the first-category mapping data.

In an embodiment, the at least one previously searched keyword in the search record is grouped into a group based on at least one corresponding meaning of the at least one previously searched keyword. The at least one previously searched keyword includes a plurality of previously searched keywords. The first-category mapping data is traversed to obtain the at least one previously searched keyword and the matched at least one stored keyword. A second mapping is established between the matched at least one stored keyword and one of the plurality of previously searched keywords in the group. The mapped at least one stored keyword and the one of the plurality of previously searched keywords are included in the first-category mapping data.

In an embodiment, the at least one stored keyword corresponding to the content information in the second-category mapping data includes an extended keyword. Target content information is determined to be included in the second-category mapping data. The extended keyword in an access record of associated information corresponding to the target content information is searched for. A second mapping is established between the target content information and the extended keyword. The mapped target content information and the extended keyword are included in the second-category mapping data.

In an embodiment, the associated information corresponding to the target information is obtained based on a topic model or a document vector model. A second previously searched keyword included in the access record of the associated information is searched for, and the second previously searched keyword is used as the extended keyword corresponding to the target information.

In an embodiment, the first-category mapping data includes a first matching degree between the at least one previously searched keyword and the at least one stored keyword. The second-category mapping data includes a second matching degree between the at least one stored keyword and the content information. A similarity is calculated between the at least one stored keyword and the content information in the second-category mapping data by using a document vector model, and the similarity is used as the second matching degree.

In an embodiment, before the content information is displayed, a content information matching degree is obtained between the target keyword and the content information according to the first matching degree and the second matching degree and the content information is sorted and filtered according to the content information matching degree, and the sorted and filtered content information is displayed.

In an embodiment, the target keyword is searched in a search engine to obtain a search result and a search matching degree between the search result and the target keyword. The search result and the content information are shuffled with reference to the search matching degree and the content information matching degree. The shuffled search result and the content information are displayed.

In an embodiment, the search matching degree of the search result and the content information matching degree of the content information are normalized to a corresponding threshold interval to obtain a normalized recommendation level value. The search result and the content information are sorted according to the recommendation level value. The sorted search result and the content information are displayed.

In an embodiment, a feedback evaluation value of the content information is obtained and the content information is filtered based on the feedback evaluation value and a threshold. The feedback evaluation value is obtained through calculation by using hits, an applause rate, and/or a poor rating rate.

In addition, to resolve the technical problem in the related technology that a recall rate of content information (e.g., promotion information) is low in the method for searching for corresponding promotion information merely by performing matching between a stored keyword and an entered retrieval entry, an information processing apparatus is provided.

In an embodiment of the present disclosure, there is provided the information processing apparatus. The information processing apparatus includes a memory and circuitry coupled to the memory. The circuitry of the information processing apparatus stores at least one keyword associated with content information and matches at least one previously searched keyword in a search record with the at least one stored keyword associated with the content information. The circuitry generates first-category mapping data based on a first mapping between the matched at least one stored keyword and the at least one previously searched keyword. The circuitry generates second-category mapping data based on the content information and the at least one stored keyword. The circuitry determines that a received target keyword is included in the first-category mapping data. In response to the received target keyword, which is included in the first-category mapping data, the circuitry searches for the content information associated with the target keyword in the second-category mapping data and displays the content information.

In an embodiment, the circuitry traverses the at least one previously searched keyword in the search record. The circuitry searches the at least one stored keyword and the at least one previously searched keyword in a third-party search engine. The circuitry calculates, by using a document vector model, a similarity between a search result corresponding to the at least one stored keyword and a search result corresponding to the at least one previously searched keyword. When the similarity is greater than a threshold, the circuitry determines that the at least one previously searched keyword matches the at least one stored keyword.

In an embodiment, the circuitry traverses the at least one previously searched keyword in the search record and calculates a text similarity between the at least one stored keyword and the at least one previously searched keyword. When the similarity is greater than a threshold, the circuitry determines that the at least one previously searched keyword matches the at least one stored keyword.

In an embodiment, the circuitry groups the at least one stored keyword into a group based on at least one corresponding meaning of the at least one stored keyword. The at least one stored keyword includes a plurality of stored keywords. The circuitry traverses the first-category mapping data to obtain the at least one stored keyword and the matched at least one previously searched keyword. The circuitry establishes a second mapping between the matched at least one previously searched keyword and one of the plurality of stored keywords in the group, and includes the mapped at least one previously searched keyword and the one of the plurality of stored keywords in the first-category mapping data.

In an embodiment, the circuitry groups the at least one previously searched keyword in the search record into a group based on at least one corresponding meaning of the at least one previously searched keyword. The at least one previously searched keyword includes a plurality of previously searched keywords. The circuitry traverses the first-category mapping data to obtain the at least one previously searched keyword and the matched at least one stored keyword. The circuitry establishes a second mapping between the matched at least one stored keyword and one of the plurality of previously searched keywords in the group. The circuitry includes the mapped at least one stored keyword and the one of the plurality of previously searched keywords in the first-category mapping data.

In an embodiment, the at least one stored keyword corresponding to the content information in the second-category mapping data includes an extended keyword. The circuitry determines that target content information is included in the second-category mapping data and searches for the extended keyword in an access record of associated information corresponding to the target content information. The circuitry establishes a second mapping between the target content information and the extended keyword and includes the mapped target content information and the extended keyword in the second-category mapping data.

In an embodiment, the circuitry obtains the associated information corresponding to the target information based on a topic model or a document vector model. The circuitry searches for a second previously searched keyword included in the access record of the associated information, and uses the second searched previously searched keyword as the extended keyword corresponding to the target information.

In an embodiment, the first-category mapping data includes a first matching degree between the at least one previously searched keyword and the at least one stored keyword and the second-category mapping data includes a second matching degree between the at least one stored keyword and the content information; The circuitry calculates a similarity between the at least one stored keyword and the content information in the second-category mapping data by using a document vector model, and uses the similarity as the second matching degree.

In an embodiment, the circuitry obtains a content information matching degree between the target keyword and the content information according to the first matching degree and the second matching degree. The circuitry sorts and filters the content information according to the content information matching degree, and displays the sorted and filtered content information.

In an embodiment, the circuitry searches the target keyword in a search engine to obtain a search result and a search matching degree between the search result and the target keyword. The circuitry shuffles the search result and the content information with reference to the search matching degree and the content information matching degree, and displays the shuffled search result and the content information.

In an embodiment, the circuitry normalizes the search matching degree of the search result and the content information matching degree of the content information to a corresponding threshold interval to obtain a normalized recommendation level value. The circuitry sorts the search result and the content information according to the recommendation level value, and displays the sorted search result and the content information.

In an embodiment, the circuitry obtains a feedback evaluation value of the content information and filters the content information based on the feedback evaluation value and a threshold. The feedback evaluation value is obtained through calculation by using hits, an applause rate, and/or a poor rating rate.

In the information processing method and apparatus, a promotion user only needs to purchase a small quantity of binding keywords (initial binding keywords) in a biding search engine, the bidding search engine can extend a mapping between a search keyword and a stored binding keyword according to a historical search record, and first-category mapping data can be established between multiple target keywords entered by a search user and a same binding keyword. Therefore, even when a smaller quantity of binding keywords are purchased for same promotion information, more matching relationships (first-category mappings) can be used for matching between a search keyword and promotion information, thereby improving a recall rate when promotion information is searched for.

In addition, in the information processing method and apparatus, a mapping (a first-category mapping) between a historical search keyword and a binding keyword is further extended, the binding keyword is clustered, the historical search keyword is clustered, and binding keywords belonging to a same cluster may be mapped to a same historical search keyword, or one binding keyword may be mapped to multiple historical search keywords belonging to a same cluster, so that an entered target keyword can match more binding keywords, thereby improving a recall rate when promotion information is searched for.

In addition, in the information processing method and apparatus, a mapping (a second-category mapping) between initial promotion information and an initial binding keyword is further extended, and an extended binding keyword of the promotion information is obtained by using an access record of associated promotion information of the promotion information, so that in addition to the mapping between the initial binding keyword and the promotion information, a mapping relationship between the extended binding keyword and the promotion information is added, and the second-category mapping is extended. Therefore, when a smaller quantity of initial binding keywords are purchased for same promotion information, entries that the promotion user does not purchase are added through extension according to a historical record as extended binding keywords, so that the mapping relationship between the binding keyword and the promotion information is extended, thereby improving a recall rate when promotion information is searched for.

BRIEF DESCRIPTION OF THE DRAWINGS

To describe the technical solutions in the embodiments of the present disclosure or in the related technologies more clearly, the following briefly describes the accompanying drawings required for describing the embodiments or the related technologies. The accompanying drawings in the following description show merely some embodiments of the present disclosure, and a person of ordinary skill in the art may still derive other drawings from these accompanying drawings.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments derived by a person of ordinary skill from the embodiments of the present disclosure shall fall within the protection scope of the present disclosure.

To resolve a technical problem in the related technology that a recall rate of promotion information is low in a method for searching for corresponding promotion information merely by performing matching between a binding or stored keyword and an entered retrieval entry, a information processing method is provided. The method may be implemented based on a computer program. The computer program may run in a computer system based on the Von Neumann architecture. The computer program may be an application program of production promotion, advertisement promotion, or application promotion based on a search engine, for example, a web search engine with a bidding rank, an application market, a large online shopping website, or an electronic commerce website. The computer system may be a server device running the application program of production promotion, advertisement promotion, or application promotion based on the search engine.

Figure 1:
FIG. 1 is a schematic diagram of an information search interface in the related technology.

For example, in an application scenario of a mobile game application market, as shown in FIG. 1, FIG. 1 is a schematic diagram of a game search interface of a mobile game application market on a client. A search box is provided on the game search interface, and a user may enter a target keyword in the search box to search for a corresponding game application. In an application of the mobile game application market, not only a corresponding game application (a search result presented at the left side of FIG. 1) can be searched for in a mobile game application database according to a target keyword, but also promotion information of a game corresponding to the target keyword can be presented on a promotion information bar of the game search interface. For example, if a maker of an application "quan min xiao xiao le" purchases a binding keyword in the mobile game application market in advance, when a target keyword entered by the user matches the binding keyword, promotion information of the application "quan min xiao xiao le" is presented on the promotion information bar, to advertise the application.

In the information processing method provided in the embodiments of the present disclosure, for example, as shown in FIG. 1, when the maker of the application "quan min xiao xiao le" purchases a small quantity of binding keywords, the target keyword that is entered by the search user and that is different from the purchased binding keyword can still be matched, and promotion information or content information presented on the promotion information bar is more related to the target keyword entered by the search user, so that the advertisement release accuracy rate is high.

To implement the foregoing functions, in the embodiments of the present disclosure, the process of searching for promotion information matching the target keyword entered by the search user is implemented by means of two mappings of first-category mapping data (a mapping between a historical search keyword or previously searched keywords and a stored binding keyword, that is, query-bid) and second-category mapping data (a mapping relationship between a stored binding keyword and promotion information, that is, content information or bid-ad). The first-category mapping data and the second-category mapping data need to be created in advance according to stored binding keyword, response promotion information, and a historical search record in a bidding search engine, and a corresponding data index needs to be created. When the promotion information matching the target keyword entered by the search user is searched for, first, a target binding keyword matching the target keyword is searched for according to the query-bid mapping (the first-category mapping data), and then, target promotion information matching the target binding keyword is searched for according to the bid-ad mapping (the second-category mapping data).

Figure 2:
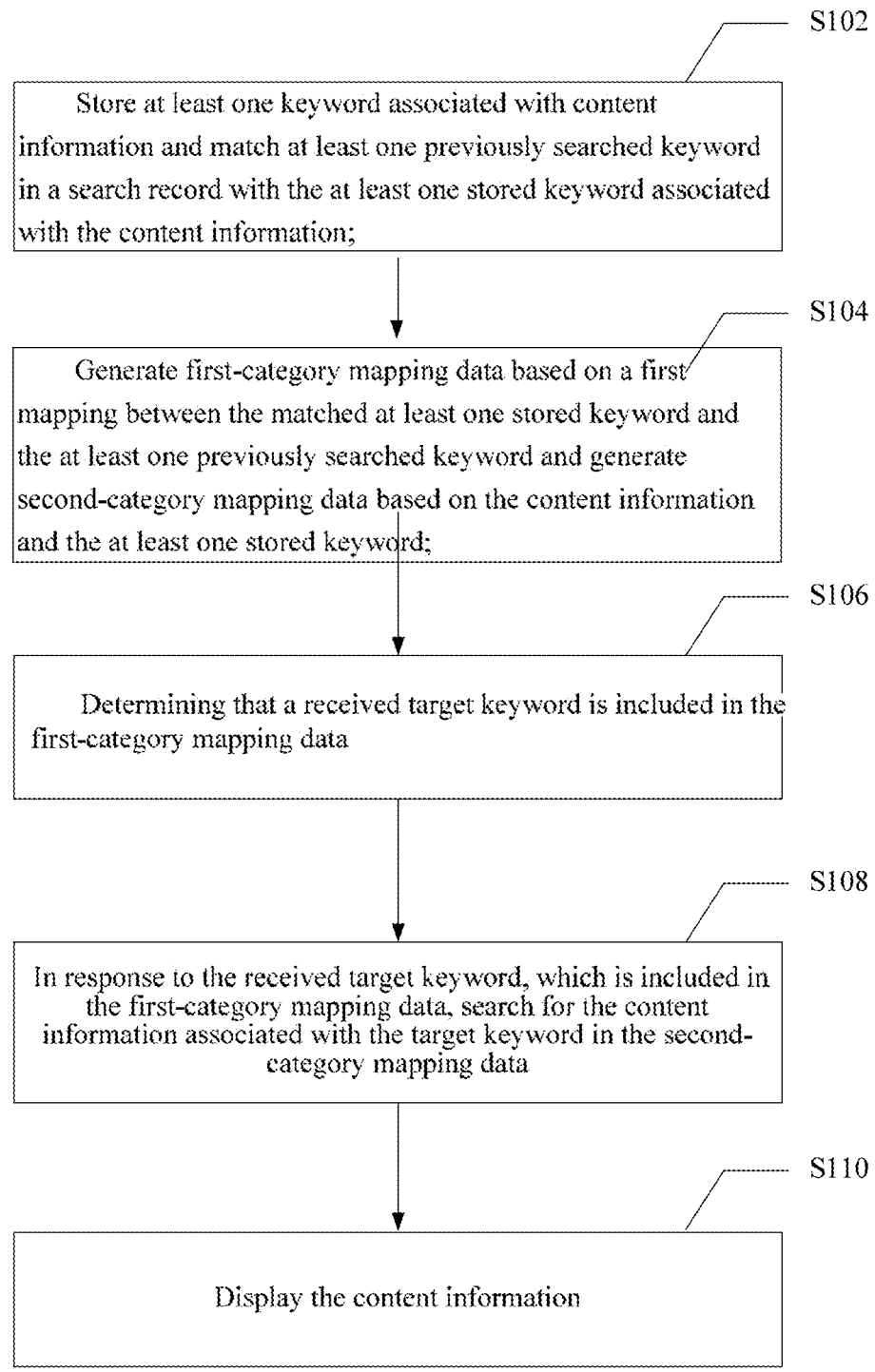
FIG. 2 is a flowchart of a promotion information pushing method according to an embodiment.

Specifically, as shown in FIG. 2, a promotion information pushing method includes the following steps:

In step S102, obtain a stored binding keyword, and search a historical search record for a historical search keyword matching the stored binding keyword. For example, at least one keyword associated with content information is stored and at least one previously searched keyword in a search record is matched with the at least one stored keyword associated with the content information.

In step S104, establish a mapping between the binding keyword and the found historical search keyword, and generate first-category mapping data. For example, first-category mapping data is generated based on a first mapping between the matched at least one stored keyword and the at least one previously searched keyword and second-category mapping data is generated based on the content information and the at least one stored keyword;

As described above, step S102 is a process of searching a historical search keyword in advance for the historical search keyword matching the binding keyword stored in a bidding search engine, to create the first-category mapping data.

For example, in an application scenario of an application market, if a binding keyword bid purchased by an application maker is "marriage seeking," and a search log of the application market includes historical search keywords queries "love and marriage" and "blind date" (that is, a user entered "love and marriage" in the application market once, to search for a corresponding application) that match the binding keyword bid "marriage seeking," the first-category mapping data query-bid is created:

love and marriage→marriage seeking blind date→marriage seeking.

That is, a matching relationship between a binding keyword purchased by a user and a target keyword entered by a search user is extended.

Specifically, in at least one embodiment, the step of searching a historical search record for a historical search keyword matching the stored binding keyword includes:

traversing a historical search keyword in the historical search record, performing searching in a third-party search engine separately by using the stored binding keyword and a historical search keyword obtained through traversal, calculating, by using a document vector model, a similarity between a search result corresponding to the stored binding keyword and a search result corresponding to the historical search keyword obtained through traversal, and when the similarity is greater than a threshold, determining that the historical search keyword obtained through traversal matches the stored binding keyword.

In the foregoing example, if the binding keyword bid purchased by the application maker is "marriage seeking," and the search log of the application market includes historical search keywords queries "love and marriage" and "divorce," searching may be performed in the third-party search engine separately by using the bid "marriage seeking," the query "love and marriage," and the query "divorce," and corresponding search results are obtained respectively. The third-party search engine may be a third-party search website having a high authority score or many page views, a third-party application market, a large-scale third-party electronic commerce website, or the like.

After the search results (which may be page data on a web page or an application presentation page according to different third-party search engines, and includes related description information) of the bid "marriage seeking," the query "love and marriage," and the query "divorce" in the third-party search engine are obtained separately, the three search results may be compared by using the document vector model doc2vec, and a similarity between the search result of the query "love and marriage" in the third-party search engine and the search result of the bid "marriage seeking" in the third-party search engine in a document vector is calculated, where the similarity is a matching degree between the query "love and marriage" and the bid "marriage seeking." Likewise, a matching degree between the query "divorce" and the bid "marriage seeking" is calculated by using the document vector model. Subsequently, the matching degrees are compared with a threshold, first-category mapping data "love and marriage→marriage seeking" can be created for the query "love and marriage" having a high matching degree, and the query "divorce" having a low matching degree is ignored.

In at least one embodiment, the step of searching a historical search record for a historical search keyword matching the stored binding keyword may alternatively include: traversing a historical search keyword in the historical search record, calculating a text similarity between the stored binding keyword and a historical search keyword obtained through traversal, and when the similarity is greater than a threshold, determining that the historical search keyword obtained through traversal matches the stored binding keyword.

For example, if the historical search record includes a historical search keyword "router," and the stored binding keyword is "wireless router," a text similarity between the two is high, and first-category mapping data between "router" and "wireless router" can be created.

In addition, it is noted that, the manner of searching for a historical search keyword corresponding to the stored binding keyword by using the third-party search engine and the manner of searching for a historical search keyword corresponding to the stored binding keyword by comparing text similarities may be independently used in different embodiments, or may be used together in a same embodiment to extend the first-category mapping data. When the third-party search engine has a high authority score (which is determined according to parameters such as page views and an applause rate), and a sufficient amount of the first-category mapping data can be obtained through extension by using the document vector model and the third-party search engine, only the manner of searching for a historical search keyword corresponding to the stored binding keyword by using the third-party search engine may be used; when a small amount of the first-category mapping data (fewer historical search keywords are found for establishing a first-category mapping to the binding keyword) is obtained by using the third-party search engine, the manner of searching for a historical search keyword corresponding to the stored binding keyword by comparing text similarities is used as an assist to further extend the first-category mapping data, so that there is sufficient first-category mapping data to be used for matching the target keyword, thereby improving a recall rate.

Figure 3:
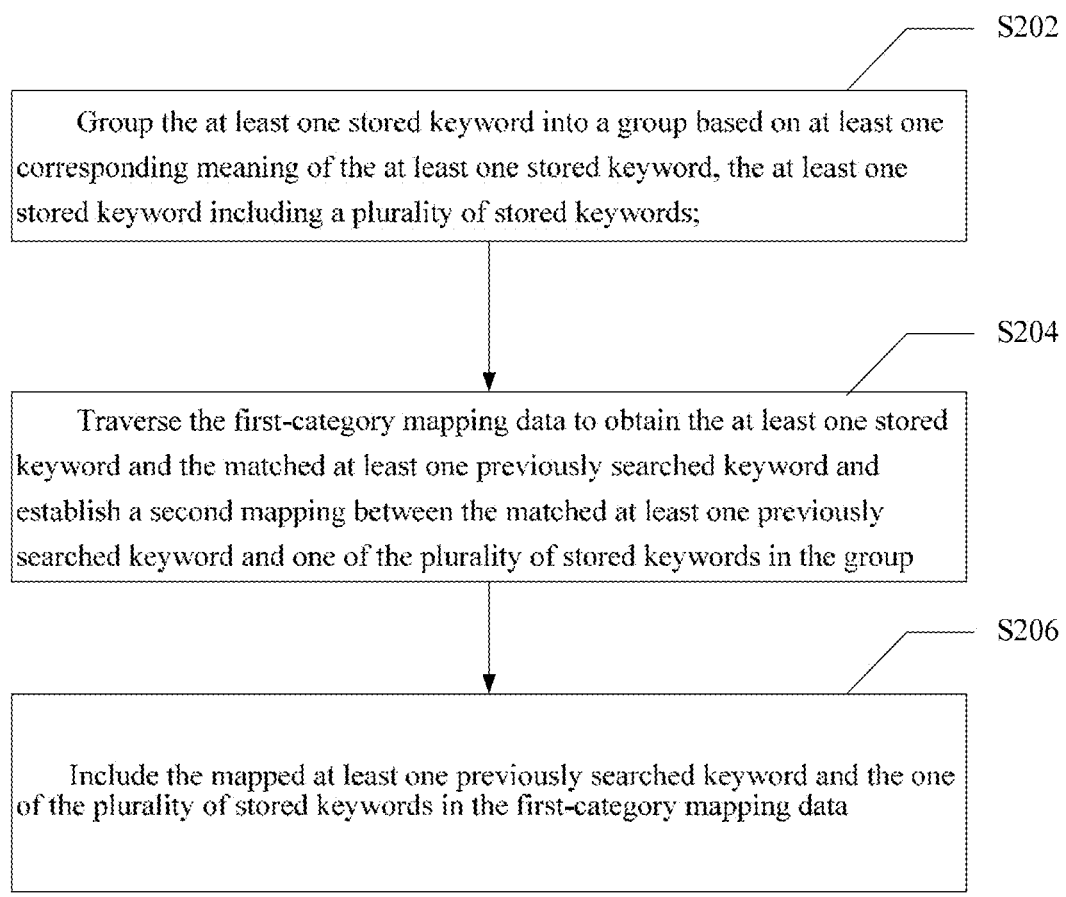
FIG. 3 is a flowchart of clustering a binding keyword to extend first-category mapping data according to an embodiment.

Further, the first-category mapping data may alternatively be extended by clustering the binding keyword or the historical search keyword. For example, as shown in FIG. 3, in at least one embodiment, after the step of generating first-category mapping data, the method further includes the following steps:

In step S202, cluster or group the stored binding keyword into a group. For example, the at least one stored keyword is grouped into a group based on at least one corresponding meaning of the at least one stored keyword, the at least one stored keyword including a plurality of stored keywords.

In step S204, traverse the first-category mapping data, to obtain a binding keyword through traversal and a corresponding historical search keyword. For example, the first-category mapping data is traversed to obtain the at least one stored keyword and the matched at least one previously searched keyword. A second mapping is established between the matched at least one previously searched keyword and one of the plurality of stored keywords in the group.

In step S206, search the stored binding keyword for a binding keyword belonging to a group of the binding keyword obtained through traversal, establish a mapping between the found binding keyword belonging to the same cluster and the historical search keyword, and extend the first-category mapping data. For example, the mapped at least one previously searched keyword and the one of the plurality of stored keywords are included in the first-category mapping data.

For example, if the first-category mapping data created above includes:

query "love and marriage"→bid "marriage seeking,"

it is learned after the stored binding keyword bid is clustered that "marriage seeking" and "making friends" belong to a same cluster, so that the query "love and marriage" in the created first-category mapping data can be mapped to the new binding keyword "making friends," to create new first-category mapping data:

query "love and marriage"-bid "making friends."

Therefore, the first-category mapping data is extended. In this embodiment, a clustering algorithm may be trained for classification by using a gradient boost decision tree (GBRT) model obtained after a corpus is manually annotated. In another embodiment, alternatively, a clustering algorithm of another type may be used.

The method for extending the first-category mapping data in this manner can resolve a problem that the first-category mapping data query-bid relies much on quality of a third-party search platform. After the binding keyword bid is clustered, a broader mapping is established between the historical search keyword and the binding keyword, so that a same query can be mapped to multiple pieces of similar promotion information.

It is noted that in the foregoing manner of extending the first-category mapping data, the extended first-category mapping data may further include a matching degree between a historical search keyword and a clustered binding keyword. The matching degree may be obtained by calculating a similarity between clustered binding keywords by using a clustering algorithm.

Figure 4:
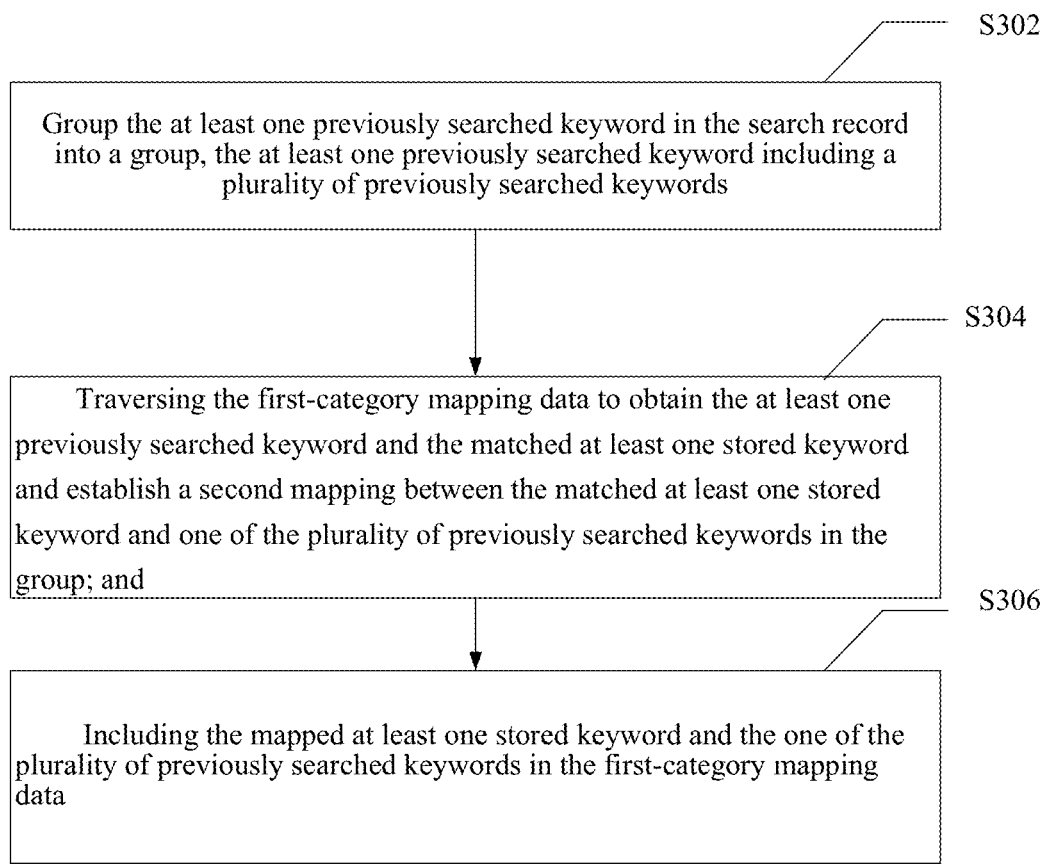
FIG. 4 is a flowchart of clustering a historical search keyword to extend first-category mapping data according to an embodiment.

For another example, as shown in FIG. 4, in at least one embodiment, after the step of generating first-category mapping data, the method further includes:

In step S302, cluster a historical search keyword in the historical search record. For example, the at least one previously searched keyword in the search record is grouped into a group, the at least one previously searched keyword including a plurality of previously searched keywords.

In step S304, traverse a historical search keyword and a corresponding binding keyword in the first-category mapping data. For example, the first-category mapping data is traversed to obtain the at least one previously searched keyword and the matched at least one stored keyword. A second mapping is established between the matched at least one stored keyword and one of the plurality of previously searched keywords in the group.

In step S306, obtain, in the historical search record, an extended historical search keyword belonging to a cluster of a historical search keyword obtained through traversal, establish a mapping between the extended historical search keyword and the binding keyword, and extend the first-category mapping data. For example, the mapped at least one stored keyword and the one of the plurality of previously searched keywords are included in the first-category mapping data.

For example, the stored historical search record includes historical search keywords query 1: purchasing, and query 2: shopping, and both the query 1 and the query 2 mean buying something or consumption. Therefore, the historical search keywords in the historical search record may be clustered, and the "query 1: purchasing" and the "query 2: shopping" belong to a same cluster, and if a binding keyword bid corresponding to the "query 1: purchasing" in created first-category mapping data is "online shopping," the created first-category mapping data includes:

query 1: purchasing→bid: online shopping; and because the "query 1: purchasing" and the "query 2: shopping" belong to the same cluster, the following mapping may be further established:

query 2: shopping→bid: online shopping.

Therefore, the second-category mapping data is extended. In this embodiment, for a clustering algorithm, topic classification may be performed by using a classical Latent Dirichlet allocation (LDA) topic model, to perform clustering. In another embodiment, alternatively, a clustering algorithm of another type may be used.

The method for extending the first-category mapping data in this manner can resolve a problem that it is not easy to match a search result of a long tail search keyword (a search keyword having a long character string) according to the first-category mapping data query-bid generated in the third-party search engine. After historical search keywords queries are clustered, a broader mapping is established between more historical search keywords and the binding keyword, so that multiple long tail queries can be mapped to same promotion information.

It is noted that in the foregoing manner of extending the first-category mapping data, the extended first-category mapping data may further include a matching degree between a historical search keyword and a clustered binding keyword. The matching degree may be obtained by calculating a similarity between clustered historical search keywords by using a clustering algorithm.

After the first-category mapping data is created and extended, and the search user enters the target keyword in the search box of the bidding search engine, the promotion information may be searched for according to the first-category mapping data. Details are still shown in FIG. 2:

In step S106, obtain a target keyword, and search the first-category mapping data for a target binding keyword corresponding to the target keyword. For example, a received target keyword is determined to be included in the first-category mapping data.

As shown in FIG. 1, the search user may enter a character string in the search box, and a target keyword for searching may be obtained by performing segmentation or the like on the character string entered by the search user. Because the binding keyword is extended in the first-category mapping data, in the foregoing example, if the first-category mapping data includes the mapping "love and marriage→marriage seeking" and the mapping "blind date→marriage seeking," when the target keyword entered by the search user includes "love and marriage" or "blind date," the binding keyword "marriage seeking" can be matched by using the first-category mapping data.

In step S108, search the second-category mapping data for promotion information corresponding to the found target binding keyword. For example, in response to the received target keyword, which is included in the first-category mapping data, the content information associated with the target keyword is searched for in the second-category mapping data.

The second-category mapping data includes a mapping relationship between a binding keyword and promotion information. In this embodiment, initial second-category mapping data is an initial binding keyword purchased by a promotion user and corresponding to promotion information. For example, a maker of a game application "kai xin xiao xiao le" may purchase "xiao xiao le" as a binding keyword of promotion information of the application "kai xin xiao xiao le." Then, an initial binding keyword corresponding to the promotion information is "xiao xiao le," and initial second-category mapping data is created between the promotion information of "kai xin xiao xiao le" and the bid "xiao xiao le." If the bid "xiao xiao le" is matched by using a target keyword "xiao chu," the promotion information of the game application "kai xin xiao xiao le" is matched.

Further, the second-category mapping data may further be extended, which is specifically:

obtaining target promotion information in stored promotion information, and obtaining an extended binding keyword corresponding to the target promotion information according to a search keyword included in an access record of associated promotion information corresponding to the target promotion information; and establishing a mapping between the extended binding keyword and the target promotion information, and extending the second-category mapping data.

For example, if the maker of the game application "kai xin xiao xiao le" purchases "xiao xiao le" as the initial binding keyword of the promotion information of the application "kai xin xiao xiao le," and a maker of a game application "tian tian ai xiao chu" may purchase "xiao chu" as an initial binding keyword of promotion information of the application "tian tian ai xiao chu," that is, the initial second-category mapping data includes a second-category mapping:

kai xin xiao xiao le→xiao xiao le tian tian ai xiao chu→xiao chu, the stored bid "xiao chu" may be used as an extended binding keyword of the promotion information of "kai xin xiao xiao le," to extend the second-category mapping data "kai xin xiao xiao le→xiao chu."

The stored promotion information may be traversed, and for target promotion information obtained through traversal, the extended binding keyword corresponding to the target promotion information may be obtained according to the search keyword included in the access record of the associated promotion information corresponding to the target promotion information.

Specifically, in at least one embodiment, the associated promotion information corresponding to the target promotion information may be obtained according to a topic model or a document vector model; and a historical search keyword included in the access record of the associated promotion information is searched for, and the found historical search keyword is used as the extended binding keyword corresponding to the target promotion information.

For example, in an application scenario of an application market, if the target promotion information is an app "Vipshop," training may be performed in a hit log or an exposure log (an access record) of promotion information by using an LDA model or a doc2vector model, to find an app "Taobao." The app "Taobao" is associated promotion information of the app "Vipshop." For example, "purchasing" and "online shopping" exist in a hit record of the app "Taobao," and two extended binding keywords "purchasing" and "online shopping" may be added for the promotion information "Vipshop."

It is noted that for the first-category mapping data and the second-category mapping data, in an actual application scenario, a data index or a data table may be created to store the mapping data. One piece of mapping data corresponds to an index entry in the data index or a data entry in the data table, and a corresponding binding keyword and promotion information can be found according to the data index and the data table during searching.

In step S110, push the found promotion information. For example, the content information is displayed.

By means of step S106 and step S108, in addition to promotion information completely the same as the binding keyword and the target keyword, more promotion information can be found according to the entered target keyword. That is, a particular piece of promotion information may be found by using multiple entered target keywords. As shown in FIG. 1, all found promotion information may be presented on a promotion information bar on a sidebar of the bidding search engine. The promotion user only needs to purchase a small quantity of binding keywords, and corresponding promotion information can be introduced after more searches, thereby improving a recall rate of the search.

In an embodiment, before the step of pushing the found promotion information, a feedback evaluation value of the found promotion information may be obtained, and promotion information whose feedback evaluation value is less than a threshold is filtered out, where the feedback evaluation value is obtained through calculation by using hits, an applause rate, and/or a poor rating rate.

For example, in an application scenario of an application market, promotion information is promotion information of an app. If an app has a small quantity of hits (an exposure amount, a quantity of downloads, a quantity of installations, or the like), or has a low applause rate, or has a high poor rating rate, it indicates that the app has a low authority score, and there is a small possibility that users accept the app. Therefore, the app may be a malicious or rogue app, and is not recommended, or a recommendation level value is low. Malicious or rogue promotion information can be filtered out according to an authority score, thereby improving the release accuracy of the promotion information.

Further, to determine a sequence of presenting pushed promotion information on a client, that is, a matching degree between promotion information and a target keyword that is entered for searching is reflected in a presentation sequence, mapping data may further include a mapping matching degree. That is, the first-category mapping data includes a first matching degree between a historical search keyword and a binding keyword. The second-category mapping data includes a second matching degree between a binding keyword and promotion information.

As described above, the first matching degree may be obtained by calculating a similarity between search results of the third-party search engine according to the document vector model, or may be obtained by comparing a text similarity between a historical search keyword and a binding keyword, or may be obtained through extension by calculating a similarity between binding keywords belonging to a same cluster or historical search keywords belonging to a same cluster. The second matching degree may be obtained by calculating a similarity between a binding keyword and promotion information in the second-category mapping data by using the document vector model.

For example, in a scenario of an application market, promotion information includes description information of an app, and a second matching degree may be obtained by calculating a similarity between a binding keyword and description information of an app by using the document vector model.

Further, after the first matching degree and the second matching degree are obtained through calculation, a promotion or content information matching degree between the target keyword and the found promotion information can be obtained according to the first matching degree and the second matching degree, and the found promotion information is sorted and filtered according to the promotion matching degree, and then, is pushed.

That is, a first matching degree between query and bid is A1, a second matching degree between bid and promotion information is A2, and a promotion matching degree obtained through calculation is A1×A2. Subsequently, sorting is performed according to values of A1×A2 of all found promotion information, and sorted promotion information or some promotion information obtained through filtration is pushed.

It is noted that for a binding keyword, in at least one embodiment, first-category mapping data whose matching degree is 1 (that is, complete match) may be created. For example, the first-category mapping data may include a first-category mapping "router"→"router," and because query is completely the same as bid, a matching degree is 1. When a target keyword entered by the search user is completely the same as the binding keyword, the binding keyword whose matching degree with the target keyword is 1 is obtained.

In another embodiment, first, it may be determined whether a target keyword completely matches a binding keyword. If the target keyword completely matches the binding keyword, the target keyword entered for searching completely matches the binding keyword, and promotion information corresponding to the matched binding keyword is directly searched for and is presented, and when the target keyword does not completely match the binding keyword, step S106 is performed.

Figure 5:
FIG. 5 is a schematic diagram of an information searching interface of shuffling and displaying a search result and promotion information according to an embodiment.

Further, as shown in FIG. 5, in an application scenario based on the bidding search engine, after a user enters a target keyword in a search box on an information search interface, a search result in the search engine and found promotion information matching the target keyword may further be shuffled and then, presented to the user. That is, searching may be performed in the search engine by using the target keyword, to obtain the search result and a search matching degree between the search result and the target keyword. Before the step of pushing the found promotion information, the search result and the found promotion information may further be shuffled with reference to the search matching degree and a promotion matching degree and are pushed.

Specifically, the search matching degree of the search result and the promotion matching degree of the found promotion information may be normalized to a corresponding threshold interval, to obtain a normalized recommendation level value; and the search result and the found promotion information are sorted according to the recommendation level value, and the search result and the found promotion information that are obtained after the sorting are pushed.

For example, in an application scenario of an application market, when a search result of an app search engine is app1, a search matching degree is normalized to 0.8 (which is a percentage relative to a maximum value of a search matching degree, and a normalized value is a relative value), and when the search result is app2, a search matching degree is normalized to 0.4. When the promotion information returned by a promotion information pushing system is adv_app1, a promotion matching degree is 0.9, and when the promotion information is adv_app2, the promotion matching degree is 0.5.

In this embodiment, N threshold intervals are divided for the search matching degree and the promotion matching degree:

[1, 0.8, 0.6, 0.4, 0.2, 0.0], N=5 then, the search matching degree of app1 and the promotion matching degree of the adv_app1 are within an interval of 0.8 to 1, and the search matching degree of app2 and the promotion matching degree of the adv_app2 are within an interval of 0.4 to 0.6, and therefore, a final shuffling sequence is app1, adv_app1, app2, and adv_app2.

As shown in FIG. 5, the search result and the promotion information are shuffled and displayed in this manner, so that when a presentation area is limited (for example, an interface of a mobile phone terminal having a small screen), a search result and promotion information that are most related to an entered target keyword are presented to the user to the greatest extent, to ensure that content that is most related to a user requirement is presented on the limited presentation area, thereby improving the content searching accuracy and improving the user experience.

Figure 6:
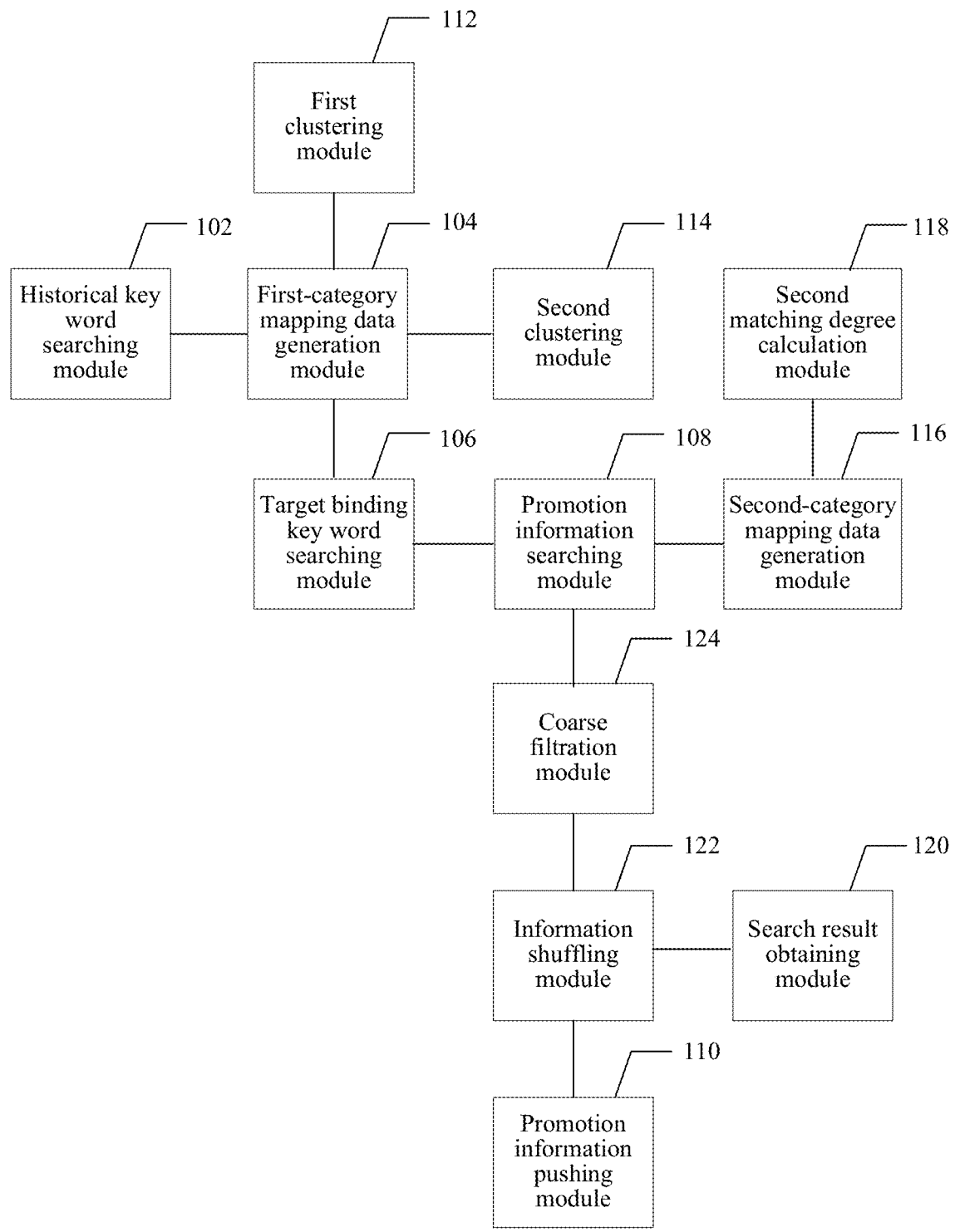
FIG. 6 is a schematic diagram of a promotion information pushing apparatus according to an embodiment.

To resolve a technical problem in the related technology that a recall rate of promotion information is low in a method for searching for corresponding promotion information merely by performing matching between a binding keyword and an entered retrieval entry, as shown in FIG. 6, a promotion information pushing apparatus corresponding to the promotion information pushing method is further provided, including a processing circuitry. The processing circuitry includes a historical keyword searching module 102, a first-category mapping data generation module 104, a target binding keyword searching module 106, a promotion information searching module 108, and a promotion information pushing module 110.

The historical keyword searching module 102 is configured to obtain a stored binding keyword, and search a historical search record for a historical search keyword matching the stored binding keyword.

The first-category mapping data generation module 104 is configured to establish a mapping between the binding keyword and the found historical search keyword, and generate first-category mapping data.

The target binding keyword searching module 106 is configured to obtain a target keyword, and search the first-category mapping data for a target binding keyword corresponding to the target keyword.

The promotion information searching module 108 is configured to search second-category mapping data for promotion information corresponding to the found target binding keyword, the second-category mapping data including a mapping relationship between a binding keyword and promotion information.

The promotion information pushing module 110 is configured to push the found promotion information.

In at least one embodiment, the historical keyword searching module 102 is further configured to traverse a historical search keyword in the historical search record, perform searching in a third-party search engine separately by using the stored binding keyword and a historical search keyword obtained through traversal, calculate, by using a document vector model, a similarity between a search result corresponding to the stored binding keyword and a search result corresponding to the historical search keyword obtained through traversal, and when the similarity is greater than a threshold, determine that the historical search keyword obtained through traversal matches the stored binding keyword.

In at least one embodiment, the historical keyword searching module 102 is further configured to traverse a historical search keyword in the historical search record, calculate a text similarity between the stored binding keyword and a historical search keyword obtained through traversal, and when the similarity is greater than a threshold, determine that the historical search keyword obtained through traversal matches the stored binding keyword.

In at least one embodiment, as shown in FIG. 6, the apparatus further includes a first clustering module 112, configured to cluster the stored binding keyword; traverse the first-category mapping data, to obtain a binding keyword through traversal and a corresponding historical search keyword; and search the stored binding keyword for a binding keyword belonging to a cluster of the binding keyword obtained through traversal, establish a mapping between the found binding keyword belonging to the same cluster and the historical search keyword, and extend the first-category mapping data.

In at least one embodiment, as shown in FIG. 6, the apparatus further includes a second clustering module 114, configured to cluster a historical search keyword in the historical search record; traverse a historical search keyword and a corresponding binding keyword in the first-category mapping data; and obtain, in the historical search record, an extended historical search keyword belonging to a cluster of a historical search keyword obtained through traversal, establish a mapping between the extended historical search keyword and the binding keyword, and extend the first-category mapping data.

In at least one embodiment, a binding keyword corresponding to promotion information in the second-category mapping data includes an initial binding keyword and an extended binding keyword.

In at least one embodiment, as shown in FIG. 6, the apparatus further includes a second-category mapping data generation module 116, configured to receive an entered initial binding keyword and corresponding promotion information, and generate second-category mapping data; obtain target promotion information in stored promotion information, and obtain an extended binding keyword corresponding to the target promotion information according to a search keyword included in an access record of associated promotion information corresponding to the target promotion information; and establish a mapping between the extended binding keyword and the target promotion information, and extend the second-category mapping data.

In at least one embodiment, the second-category mapping data generation module 116 is further configured to obtain the associated promotion information corresponding to the target promotion information according to a topic model or a document vector model; and search for a historical search keyword included in the access record of the associated promotion information, and use the found historical search keyword as the extended binding keyword corresponding to the target promotion information.

In at least one embodiment, the first-category mapping data further includes a first matching degree between a historical search keyword and a binding keyword; and the second-category mapping data further includes a second matching degree between a binding keyword and promotion information.

In at least one embodiment, as shown in FIG. 6, the apparatus further includes a second matching degree calculation module 118, configured to calculate a similarity between a binding keyword and promotion information in the second-category mapping data by using the document vector model, and use the similarity as a second matching degree between the binding keyword and the promotion information.

In at least one embodiment, the promotion information pushing module 110 is further configured to obtain a promotion matching degree between the target keyword and the found promotion information according to the first matching degree and the second matching degree; and sort and filter the found promotion information according to the promotion matching degree, and push the promotion information obtained after the sorting and filtering.

In at least one embodiment, as shown in FIG. 6, the apparatus further includes a search result obtaining module 120 and an information shuffling module 122, where the search result obtaining module 120 is configured to perform searching in the search engine by using the target keyword to obtain a search result and a search matching degree between the search result and the target keyword; and the information shuffling module 122 is configured to shuffle the search result and the found promotion information with reference to the search matching degree and the promotion matching degree, and push the search result and the found promotion information that are obtained after the shuffling.

In at least one embodiment, the information shuffling module 122 is further configured to normalize the search matching degree of the search result and the promotion matching degree of the found promotion information to a corresponding threshold interval, to obtain a normalized recommendation level value; and sort the search result and the found promotion information according to the recommendation level value, and push the search result and the found promotion information that are obtained after the sorting.

In at least one embodiment, as shown in FIG. 6, the apparatus further includes a coarse filtration module 124, configured to obtain a feedback evaluation value of the found promotion information, and filter out promotion information whose feedback evaluation value is less than a threshold, where the feedback evaluation value is obtained through calculation by using hits, an applause rate, and/or a poor rating rate.

In the promotion information pushing method and apparatus, a promotion user only needs to purchase a small quantity of binding keywords (initial binding keywords) in a biding search engine, the bidding search engine can extend a mapping between a search keyword and a stored binding keyword according to a historical search record, and first-category mapping data can be established between multiple target keywords entered by a search user and a same binding keyword. Therefore, even when a smaller quantity of binding keywords are purchased for same promotion information, more matching relationships (first-category mappings) can be used for matching between a search keyword and promotion information, thereby improving a recall rate when promotion information is searched for.

In addition, in the promotion information pushing method and apparatus, a mapping (a first-category mapping) between a historical search keyword and a binding keyword is further extended, the binding keyword is clustered, the historical search keyword is clustered, and binding keywords belonging to a same cluster may be mapped to a same historical search keyword, or one binding keyword may be mapped to multiple historical search keywords belonging to a same cluster, so that an entered target keyword can match more binding keywords, thereby improving a recall rate when promotion information is searched for.

In addition, in the promotion information pushing method and apparatus, a mapping (a second-category mapping) between initial promotion information and an initial binding keyword is further extended, and an extended binding keyword of the promotion information is obtained by using an access record of associated promotion information of the promotion information, so that in addition to the mapping between the initial binding keyword and the promotion information, a mapping relationship between the extended binding keyword and the promotion information is added, and the second-category mapping is extended. Therefore, when a smaller quantity of initial binding keywords are purchased for same promotion information, entries that the promotion user does not purchase are added through extension according to a historical record as extended binding keywords, so that the mapping relationship between the binding keyword and the promotion information is extended, thereby improving a recall rate when promotion information is searched for.

Figure 7:
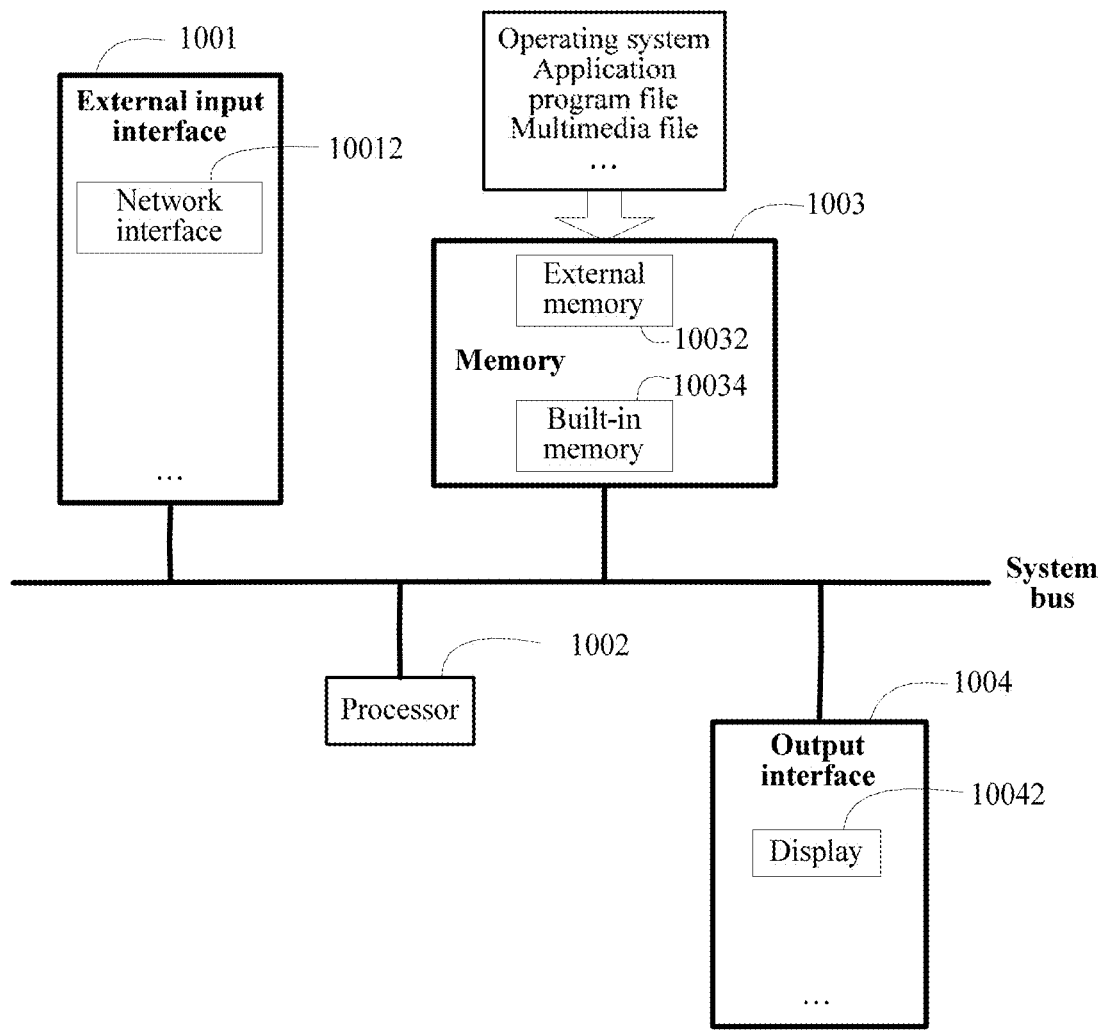
FIG. 7 is a schematic structural diagram of a computer device performing the promotion information pushing method according to an embodiment.

In at least one embodiment, as shown in FIG. 7, FIG. 7 shows a terminal 10 of a computer system based on the Von Neumann architecture, where the terminal 10 performs the promotion information pushing method. The computer system may be a terminal device such as a smartphone, a tablet computer, a palmtop computer, a notebook computer, or a personal computer. Specifically, the terminal 10 may include an external input interface 1001, a processor 1002, a memory 1003, and an output interface 1004 that are connected by using a system bus. In an embodiment, the external input interface 1001 may include at least a network interface 10012. The memory 1003 may include an external memory 10032 (for example, a hard disk, an optical disc, or a floppy disk) and a built-in memory 10034. The output interface 1004 may include at least a device such as a display 10042.

In this embodiment, the method is performed based on a computer program. The computer program is stored in the external memory 10032 of the computer system based on the Von Neumann architecture, and when the computer program is executed, the computer program is loaded to the built-in memory 10034, and then, is transferred to the processor 1002 for execution after being compiled into machine code, so that the computer system 10 based on the Von Neumann architecture includes the logical historical keyword searching module 102, first-category mapping data generation module 104, target binding keyword searching module 106, promotion information searching module 108, and promotion information pushing module 110. In addition, in a process of performing the promotion information pushing method, an input parameter is received by means of the external input interface 1001, is transferred to the memory 1003 for buffering, and then, is input to the processor 1002 for processing. Processing result data is buffered in the memory 1003 for subsequent processing, or is transferred to the output interface 1004 for outputting.

The terminal 10 includes:

the memory 1003, configured to store the computer program; and the processor 1002, configured to execute the computer program, to perform the following steps:

obtaining a stored binding keyword, and searching a historical search record for a historical search keyword matching the stored binding keyword;

establishing a mapping between the binding keyword and the found historical search keyword, and generating first-category mapping data;

obtaining a target keyword, and searching the first-category mapping data for a target binding keyword corresponding to the target keyword;

searching second-category mapping data for promotion information corresponding to the found target binding keyword, the second-category mapping data including a mapping relationship between a binding keyword and promotion information; and pushing the found promotion information.

In at least one embodiment, the step of searching a historical search record for a historical search keyword matching the stored binding keyword includes: traversing a historical search keyword in the historical search record, performing searching in a third-party search engine separately by using the stored binding keyword and a historical search keyword obtained through traversal, calculating, by using a document vector model, a similarity between a search result corresponding to the stored binding keyword and a search result corresponding to the historical search keyword obtained through traversal, and when the similarity is greater than a threshold, determining that the historical search keyword obtained through traversal matches the stored binding keyword.

In at least one embodiment, the step of searching a historical search record for a historical search keyword matching the stored binding keyword includes: traversing a historical search keyword in the historical search record, calculating a text similarity between the stored binding keyword and a historical search keyword obtained through traversal, and when the similarity is greater than a threshold, determining that the historical search keyword obtained through traversal matches the stored binding keyword.

In at least one embodiment, after the step of generating first-category mapping data, the processor 1002 is further configured to execute the computer program, to perform the following steps: clustering the stored binding keyword; traversing the first-category mapping data, to obtain a binding keyword through traversal and a corresponding historical search keyword; and searching the stored binding keyword for a binding keyword belonging to a cluster of the binding keyword obtained through traversal, establishing a mapping between the found binding keyword belonging to the same cluster and the historical search keyword, and extending the first-category mapping data.

In at least one embodiment, after the step of generating first-category mapping data, the processor 1002 is further configured to execute the computer program, to perform the following steps: clustering a historical search keyword in the historical search record; traversing a historical search keyword and a corresponding binding keyword in the first-category mapping data; and obtaining, in the historical search record, an extended historical search keyword belonging to a cluster of a historical search keyword obtained through traversal, establishing a mapping between the extended historical search keyword and the binding keyword, and extending the first-category mapping data.

In at least one embodiment, a binding keyword corresponding to promotion information in the second-category mapping data includes an initial binding keyword and an extended binding keyword; and the processor 1002 is further configured to execute the computer program, to perform the following steps: receiving an entered initial binding keyword and corresponding promotion information, and generating second-category mapping data; obtaining target promotion information in stored promotion information, and obtaining an extended binding keyword corresponding to the target promotion information according to a search keyword included in an access record of associated promotion information corresponding to the target promotion information; and establishing a mapping between the extended binding keyword and the target promotion information, and extending the second-category mapping data.

In at least one embodiment, the step of obtaining an extended binding keyword corresponding to the target promotion information according to a search keyword included in an access record of associated promotion information corresponding to the target promotion information includes: obtaining the associated promotion information corresponding to the target promotion information according to a topic model or a document vector model; and searching for a historical search keyword included in the access record of the associated promotion information, and using the found historical search keyword as the extended binding keyword corresponding to the target promotion information.

In at least one embodiment, the first-category mapping data further includes a first matching degree between a historical search keyword and a binding keyword; the second-category mapping data further includes a second matching degree between a binding keyword and promotion information; and the processor 1002 is further configured to execute the computer program, to perform the following steps: calculating a similarity between a binding keyword and promotion information in the second-category mapping data by using the document vector model, and using the similarity as a second matching degree between the binding keyword and the promotion information.

In at least one embodiment, before the step of pushing the found promotion information, the processor 1002 is further configured to execute the computer program, to perform the following steps: obtaining a promotion matching degree between the target keyword and the found promotion information according to the first matching degree and the second matching degree; and sorting and filtering the found promotion information according to the promotion matching degree, and pushing the promotion information obtained after the sorting and filtering.

In at least one embodiment, In at least one embodiment, the step of shuffling the search result and the found promotion information with reference to the search matching degree and the promotion matching degree, and pushing the search result and the found promotion information that are obtained after the shuffling is: normalizing the search matching degree of the search result and the promotion matching degree of the found promotion information to a corresponding threshold interval, to obtain a normalized recommendation level value; and sorting the search result and the found promotion information according to the recommendation level value, and pushing the search result and the found promotion information that are obtained after the sorting.

In at least one embodiment, before the step of pushing the found promotion information, the processor 1002 is further configured to execute the computer program, to perform the following steps: obtaining a feedback evaluation value of the found promotion information, and filtering out promotion information whose feedback evaluation value is less than a threshold, where the feedback evaluation value is obtained through calculation by using hits, an applause rate, and/or a poor rating rate.

What is disclosed above is merely an example of the embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. An information processing method, comprising:
matching at least one previously searched keyword of a plurality of previously searched keywords in a search record with a predetermined keyword based on determined degrees of similarity between the predetermined keyword and the plurality of previously searched keywords, the predetermined keyword being predetermined as associated with promotion content information in response to a request from a promotion user that is an advertisement promoter;
generating first-category mapping data that indicates a first mapping between the predetermined keyword and the at least one previously searched keyword determined based on the degrees of similarity between the predetermined keyword and the plurality of previously searched keywords;
storing second-category mapping data that indicates the association between the promotion content information and the predetermined keyword;
after the first-category mapping data is generated, determining whether a received target keyword entered by a search user is one of the at least one previously searched keyword that was mapped to the predetermined keyword in the first-category mapping data; and
in response to receiving the target keyword entered by the search user and the received target keyword being determined to be one of the at least one previously searched keyword mapped to the predetermined keyword in the first-category mapping data,
identifying, by circuitry of an information processing apparatus, the predetermined keyword mapped in the first-category mapping data to the one of the at least one previously searched keyword that is the same as the target keyword entered by the search user,
determining, by the circuitry of the information processing apparatus, the promotion content information associated with the predetermined keyword mapped to the one of the at least one previously searched keyword that is the target keyword based on the second-category mapping data,
obtaining a feedback evaluation value of the promotion content information and filtering the promotion content information based on the feedback evaluation value and a feedback threshold, the feedback evaluation value being obtained through calculation by using hits, an applause rate, and/or a poor rating rate, and
displaying the promotion content information based on the filtering,
wherein the matching the at least one previously searched keyword comprises
traversing the at least one previously searched keyword in the search record;
searching the predetermined keyword and the at least one previously searched keyword in a third-party search engine;
calculating, by using a document vector model, a degree of similarity between a search result corresponding to the predetermined keyword and a search result corresponding to each of the at least one previously searched keyword; and
when the degree of similarity between the search result corresponding to the predetermined keyword and the search result corresponding to a respective one of the at least one previously searched keyword is greater than a similarity threshold, determining that the respective one of the at least one previously searched keyword matches the predetermined keyword.

2. The information processing method according to claim 1, wherein after the generating the first-category mapping data, the method further comprises:
grouping the predetermined keyword and one or more other predetermined keywords into a group based on at least one corresponding meaning of the predetermined keyword and the one or more other predetermined keywords, the one or more other predetermined keywords being predetermined as associated with other promotion content information;
establishing a second mapping between the at least one previously searched keyword and one of the one or more other predetermined keywords in the group; and
updating the first-category mapping data to further indicate the second mapping.

3. The information processing method according to claim 1, wherein after the generating the first-category mapping data, the method further comprises:
grouping the at least one previously searched keyword and one or more other previously searched keywords in the search record into a group based on at least one corresponding meaning of the at least one previously searched keyword and the one or more other previously searched keywords;
establishing a second mapping between the predetermined keyword and one of the one or more other previously searched keywords in the group; and
updating the first-category mapping data to further indicate the second mapping.

4. The information processing method according to claim 1, further comprising:
identifying target promotion content information that is included in the second-category mapping data;
searching for an extended keyword in an access record of associated information corresponding to the target promotion content information;
establishing a second mapping between the target promotion content information and the extended keyword; and
updating the second-category mapping data to further indicate the second mapping.

5. The information processing method according to claim 4, wherein the searching for the extended keyword comprises:
obtaining the associated information corresponding to the target promotion content information based on a topic model or a document vector model; and
searching for a second previously searched keyword included in the access record of the associated information, and using the second previously searched keyword as the extended keyword corresponding to the target promotion content information.

6. The information processing method according to claim 1, wherein
the first-category mapping data includes a first matching degree between the at least one previously searched keyword and the predetermined keyword;

the second-category mapping data includes a second matching degree between the predetermined keyword and the promotion content information; and the method further includes calculating a similarity between the predetermined keyword and the promotion content information in the second-category mapping data by using a document vector model, and using the similarity as the second matching degree.

7. The information processing method according to claim 6, wherein before the displaying the promotion content information, the method further comprises:

obtaining a content information matching degree between the target keyword and the promotion content information according to the first matching degree and the second matching degree; and sorting and filtering the promotion content information according to the content information matching degree, and displaying the sorted and filtered promotion content information.

8. The information processing method according to claim 7, further comprising:

searching the target keyword in a search engine to obtain a search result and a search matching degree between the search result and the target keyword; and shuffling the search result and the promotion content information with reference to the search matching degree and the content information matching degree, and displaying the shuffled search result and the promotion content information.

9. The information processing method according to claim 8, wherein the shuffling the search result and the promotion content information further comprises:

normalizing the search matching degree of the search result and the content information matching degree of the promotion content information to a corresponding threshold interval to obtain a normalized recommendation level value; and sorting the search result and the promotion content information according to the recommendation level value, and displaying the sorted search result and the promotion content information.

10. An information processing apparatus, comprising:

a memory, and circuitry coupled to the memory and configured to:

match at least one previously searched keyword of a plurality of previously searched keywords in a search record with a predetermined keyword based on determined degrees of similarity between the predetermined keyword and the plurality of previously searched keywords, the predetermined keyword being predetermined as associated with promotion content information in response to a request from a promotion user that is an advertisement promoter;

generate first-category mapping data that indicates a first mapping between the predetermined keyword and the at least one previously searched keyword determined based on the degrees of similarity between the predetermined keyword and the plurality of previously searched keywords;

store second-category mapping data that indicates the association between the promotion content information and the predetermined keyword;

after the first-category mapping data is generated, determine whether a received target keyword entered by a search user is one of the at least one previously searched keyword that was mapped to the predetermined keyword in the first-category mapping data; and in response to receiving the target keyword entered by the search user and the received target keyword being determined to be one of the at least one previously searched keyword mapped to the predetermined keyword in the first-category mapping data, identify the predetermined keyword mapped in the first-category mapping data to the target keyword entered by the search user, determine the promotion content information associated with the predetermined keyword mapped to the one of the at least one previously searched keyword that is the target keyword based on the second-category mapping data, obtain a feedback evaluation value of the promotion content information and filter the promotion content information based on the feedback evaluation value and a feedback threshold, the feedback evaluation value being obtained through calculation by using hits, an applause rate, and/or a poor rating rate, and display the promotion content information based on the filtering, wherein the circuitry matches the at least one previously searched keyword by traversing the at least one previously searched keyword in the search record;

searching the predetermined keyword and the at least one previously searched keyword in a third-party search engine;

calculating, by using a document vector model, a degree of similarity between a search result corresponding to the predetermined keyword and a search result corresponding to each of the at least one previously searched keyword; and when the degree of similarity between the search result corresponding to the predetermined keyword and the search result corresponding to a respective one of the at least one previously searched keyword is greater than a similarity threshold, determining that the respective one of the at least one previously searched keyword matches the predetermined keyword.

11. The information processing apparatus according to claim 10, wherein the circuitry is further configured to:

group the predetermined keyword and one or more other predetermined keywords into a group based on at least one corresponding meaning of the predetermined keyword and the one or more other predetermined keywords, the one or more other predetermined keywords being predetermined as associated with other promotion content information;

establish a second mapping between the at least one previously searched keyword and one of the one or more other predetermined keywords in the group; and update the first-category mapping data to further indicate the second mapping.

12. The information processing apparatus according to claim 10, wherein after the first-category mapping data is generated, the circuitry is further configured to:

group the at least one previously searched keyword and one or more other previously searched keywords in the search record into a group based on at least one corresponding meaning of the at least one previously searched keyword and the one or more other previously searched keywords;

establish a second mapping between the predetermined keyword and one of the one or more other previously searched keywords in the group; and update the first-category mapping data to further indicate the second mapping.

13. The information processing apparatus according to claim 10, wherein the circuitry is further configured to:

identify target promotion content information that is included in the second-category mapping data;

search for an extended keyword in an access record of associated information corresponding to the target promotion content information;

establish a second mapping between the target promotion content information and the extended keyword; and update the second-category mapping data to further indicate the second mapping.

14. The information processing apparatus according to claim 13, wherein the circuitry is further configured to obtain the associated information corresponding to the target promotion content information based on a topic model or a document vector model; and search for a second previously searched keyword included in the access record of the associated information, and use the second previously searched keyword as the extended keyword corresponding to the target promotion content information.

15. The information processing apparatus according to claim 10, wherein the first-category mapping data further includes a first matching degree between the at least one previously searched keyword and the predetermined keyword;

the second-category mapping data includes a second matching degree between the predetermined keyword and the promotion content information; and the circuitry is further configured to calculate a similarity between the predetermined keyword and the promotion content information in the second-category mapping data by using a document vector model, and use the similarity as the second matching degree.

* * * * *